Nov. 16, 1926.
F. B. BALL
1,607,384
COLLAPSIBLE POLE
Filed June 5, 1923
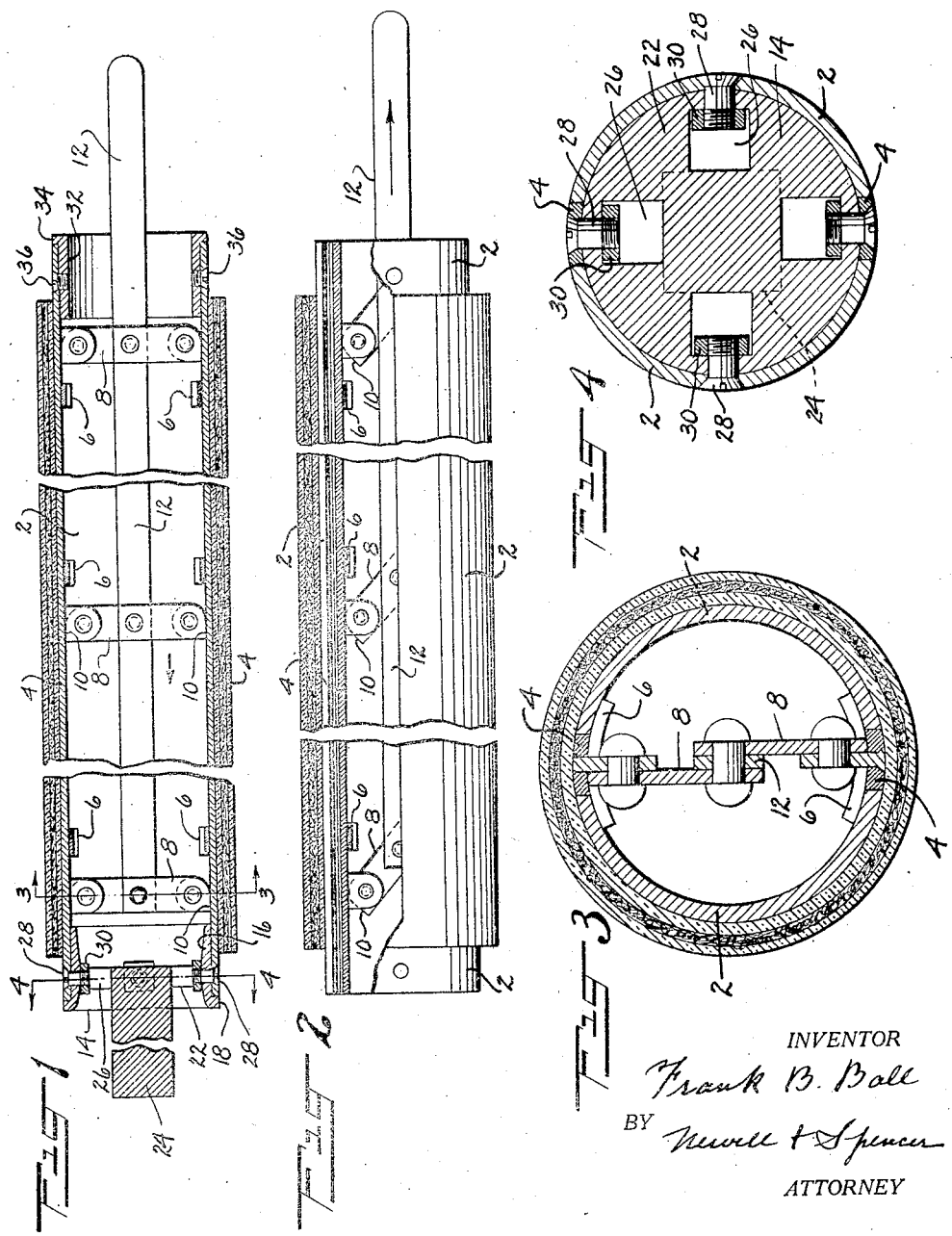
INVENTOR
Frank B. Ball
BY Newell & Spencer
ATTORNEY Patented Nov. 16, 1926.

1,607,384

UNITED STATES PATENT OFFICE.

FRANK B. BALL, OF PASSAIC, NEW JERSEY, ASSIGNOR TO THE MANHATTAN RUBBER MFG. CO., OF PASSAIC, NEW JERSEY, A CORPORATION OF NEW JERSEY.

COLLAPSIBLE POLE.

Application filed June 5, 1923. Serial No. 643,542.

This invention relates to collapsible mandrels or poles, and more particularly to devices of this class for use in making rubber hose.

In the manufacture of rubber hose it has been common practice to build up the hose of layers of unvulcanized rubber stock and canvas, or other fibrous material, upon a solid metal pole. After the hose has been built up to the proper thickness upon the pole, it is subjected to a vulcanizing temperature for the required length of time to vulcanize the rubber stock, the vulcanizing operation being performed while the stock is supported on the pole. After the vulcanization of the hose, it is, of course, necessary to remove the same from the pole. This is a difficult operation on account of the adhesion of the rubber to the pole and also because of the fact that the rubber shrinks to a certain degree during the vulcanizing operation so that it tends to cling to the pole. Removal of a section of the hose of any considerable length from the pole often requires a number of men several hours, and the labor and time required in the operation greatly increase the cost of hose manufacture. Furthermore, if the operation is not performed with care, the hose is liable to injury in the removal of the same from the pole.

The principal object of the present invention is to produce a mandrel or pole constructed for the manufacture of rubber hose thereon from which the hose may be quickly and easily removed after vulcanization.

With this and other objects in view, the invention consists in the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the construction therein shown.

In the drawings Fig. 1 is a sectional view of a pole embodying the invention taken in a plan through the axis of the pole;

Fig. 2 is a view partly in side elevation and partly in longitudinal section, illustrating certain of the parts in different positions from the positions in which they are shown in Fig. 1;

Fig. 3 is a transverse sectional view taken substantially on the line 3—3 of Fig. 1, and Fig. 4 is a transverse sectional view taken substantially on the line 4—4 of Fig. 1.

In the preferred form of the invention as illustrated in the drawings, the pole comprises a series of longitudinal substantially rigid sections constructed and arranged to form, when expanded, a cylindrical support having a continuous peripheral surface. These sections comprise two opposed relatively wide sections 2 and two opposed relatively narrow sections 4. These sections are each arcuate in cross section and are arranged when expanded to lie with their edges in abutting relation, as clearly shown in the drawings. The abutting edges of the sections 2 and 4 are arranged so that the sections 4 may be collapsed with relation to the sections 2 in a radial direction, as shown in the drawings. The faces of these abutting edges lie in parallel planes parallel with the axis of the cylindrical peripheral surface of the pole. The sections 4, when expanded, will hold the sections 2 from collapsing, and when the sections 4 are withdrawn toward the axis of the pole or collapsed, the sections 2 will be allowed to collapse. In order to hold the sections 2 in position with relation to the sections 4, a series of arcuate holding plates 6 are mounted on the sections 4 of the pole and are arranged to extend laterally beyond the same so as to engage the adjacent margins of the sections 2, as clearly shown in the drawings.

In order to hold the sections 4 of the pole in expanded position and to collapse the same when desired, these sections are connected by a series of pairs of toggle links 8, each pivotally connected with one of the sections 4 and pivotally connected at their inner ends, thereby forming toggle levers. The movement of these links in one direction with relation to the sections 4 of the pole is limited by the engagement of the projections or shoulders 10 on the links with said sections, these shoulders being arranged to arrest the movement of the links in the direction of the arrow, Fig. 1, when the toggles are in straightened position. The toggles are broken to collapse the sections 4 by a movement of the same in an opposite direction to that indicated by the arrow. To enable the toggles to be actuated by the operator to collapse the toggles, the toggles are pivotally connected at their central points to a bar 12 extending longitudinally through the pole and projecting beyond the end of the same so that it may be grasped and advanced or retracted by the operator.

In order to hold the sections 2 and 4 of the pole in assembled relation and to support the same firmly and securely during the building of the hose thereon, the sections of the pole are supported at their ends in expanded position by means of heads removably mounted within the ends of the several sections. One of these heads indicated generally at 14, comprises a substantially cylindrical hollow body 16 arranged to be inserted within the sections of the pole, and an outwardly extending flange 18 arranged to abut against the ends of said sections. The body 16 of the head is spanned by a web portion 22 from which projects a stud 24 adapted to be inserted in a rotary chuck for the purpose of rotating the pole. The web 22 is formed with a series of slots 26 as shown clearly in Fig. 4. The sections 2 of the pole are secured to the head 14 by means of a series of bolts 28 passing through openings in said sections and through the outer portion of the head, the inner ends of these bolts projecting into the slots 26. Upon the inner ends of the bolts within the slots are threaded the nuts 30.

The other head of the pole consists of a ring 32, the body of which is arranged to fit within the sections 2 and 4 and is formed with a peripheral flange 34 arranged to engage the ends of said sections. The sections 2 of the pole are secured to the ring 32 by means of a series of screws 36.

When the pole is in condition for the building of a section of hose thereon, the sections 2 and 4 of the pole are in expanded position and the heads 14 and 32 are inserted within the ends of the said sections and are secured in position by the bolts 28 and screws 36, all as shown in Fig. 1. The stud 24 on the head 14 may be inserted in a rotary chuck to drive the pole, and the pole may be peripherally supported by suitable rollers during the building of the hose. After the hose has been vulcanized upon the pole and it is desired to remove the pole from the hose, the bolts 28 and screws 36 are removed and the heads 14 and 32 are withdrawn from the ends of the pole sections. The operator then grasps the end of the bar 12 and draws the same outwardly to break the toggle levers connecting the sections 4. This causes the relative collapse of the sections 4 and these sections are removed endwise from the inside of the hose. The removal of the sections 4 leaves the sections 2 free to be collapsed and these sections may be readily freed from the wall of the hose and withdrawn endwise from the same.

The pole above described is comparatively simple in construction and inexpensive to manufacture and is arranged so that it may be withdrawn from a section of hose after vulcanization in a small fraction of the time required in this operation when a solid pole is employed. Furthermore, the present construction is strong and durable and will stand up well under the treatment to which it is subjected in hose manufacturing operations.

While the present invention is particularly intended for use in the manufacture of hose, it is to be understood that it is not limited in its application to hose manufacture, but that certain features thereof may be embodied in mandrels for other purposes.

It will also be understood that the invention is not limited to the particular construction and arrangement of parts of the illustrated embodiment of the invention, but that the invention may be embodied in other forms within the scope of the claims.

Having explained the nature and object of the invention and having specifically described a device embodying the invention in its preferred form, what is claimed is:

1. A collapsible pole, comprising substantially rigid longitudinal sections constructed and arranged when expanded to form a pole having a continuous peripheral surface with the surface of each section flush with the surfaces of adjacent sections, means for expanding and contracting certain of said sections, and heads at each end of the sections for holding the sections in expanded position, removably mounted with relation to the sections to enable the sections to be collapsed.

2. A collapsible pole, comprising substantially rigid longitudinal sections constructed and arranged when expanded to form a pole having a continuous peripheral surface with the surfaces of each section flush with the surfaces of adjacent sections, heads at each end of the sections for holding the sections in expanded positions, and means for removably securing the heads to certain of said sections.

3. A collapsible pole, comprising substantially rigid longitudinal sections constructed and arranged when expanded to form a pole having a continuous peripheral surface with the surface of each section flush with the surfaces of adjacent sections, heads inserted within the ends of the sections and removably connected to certain of the sections, and means connecting other of the sections for expanding and collapsing the same and for holding the same in assembled relation to said first sections.

4. A collapsible pole comprising longitudinal sections constructed and arranged, when expanded, to form a pole having a continuous peripheral surface, heads at each end of said sections for supporting the same removably mounted to allow the sections to be collapsed, and means for expanding two opposed sections and holding them in expanded position and for collapsing said opposed sections to allow the other sections to be collapsed.

5. A collapsible pole comprising substantially rigid longitudinal sections constructed and arranged, when expanded, to form a pole having a continuous peripheral surface, heads at each end of said sections for supporting the same, removably mounted to allow the sections to be collapsed, and means for holding a plurality of said sections in expanded position upon removal of the heads and for collapsing the same.

6. A collapsible pole comprising longitudinal sections constructed and arranged to form, when expanded, a pole having a continuous peripheral surface, heads at each end of said sections for supporting the same, removably mounted to allow the sections to be collapsed, means for supporting one or more of said sections in expanded position upon the removal of the heads, arranged to be actuated to allow said sections to be collapsed, and actuating mechanism therefor extending through an opening in one of said heads.

Signed at Passaic, New Jersey, this 29th day of May, 1923.

FRANK B. BALL.